(12) United States Patent
Sun et al.

(10) Patent No.: US 11,210,546 B2
(45) Date of Patent: Dec. 28, 2021

(54) END-TO-END TEXT RECOGNITION METHOD AND APPARATUS, COMPUTER DEVICE AND READABLE MEDIUM

(71) Applicant: BEIJING BAIDU NETCOM SCIENCE AND TECHNOLOGY CO., LTD., Beijing (CN)

(72) Inventors: Yipeng Sun, Beijing (CN); Chengquan Zhang, Beijing (CN); Zuming Huang, Beijing (CN); Jiaming Liu, Beijing (CN); Junyu Han, Beijing (CN); Errui Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 29 days.

(21) Appl. No.: 16/822,085

(22) Filed: Mar. 18, 2020

(65) Prior Publication Data
US 2021/0004629 A1 Jan. 7, 2021

(30) Foreign Application Priority Data
Jul. 5, 2019 (CN) .......................... 201910602608.4

(51) Int. Cl.
*G06K 9/46* (2006.01)
*G06K 9/32* (2006.01)
*G06K 9/62* (2006.01)

(52) U.S. Cl.
CPC ............. *G06K 9/46* (2013.01); *G06K 9/325* (2013.01); *G06K 9/6256* (2013.01); *G06K 2209/01* (2013.01)

(58) Field of Classification Search
None
See application file for complete search history.

(56) References Cited

U.S. PATENT DOCUMENTS 8,953,885 B1 * 2/2015 Och .................... G06K 9/50
382/177
10,423,827 B1 * 9/2019 Wu .................... G06K 9/00463
(Continued)

FOREIGN PATENT DOCUMENTS

CN 108229303 A 6/2018
CN 109271967 A 1/2019
(Continued)

OTHER PUBLICATIONS

Search Report of Chinese application No. 2019106026084 dated Jun. 25, 2021, 3 pages.

*Primary Examiner* — Oneal R Mistry
*Assistant Examiner* — Nicolas James Boyajian
(74) *Attorney, Agent, or Firm* — Brooks Kushman P.C.

(57) ABSTRACT

The present disclosure proposes an end-to-end text recognition method and apparatus, computer device and readable medium. The method comprises: obtaining a to-be-recognized picture containing a text region; recognizing a position of the text region in the to-be-recognized picture and text content included in the text region with a pre-trained end-to-end text recognition model; the end-to-end text recognition model comprising a region of interest perspective transformation processing module for performing perspective transformation processing for the text region. The technical solution of the present disclosure does not need to serially arrange a plurality of steps, and may avoid introducing the accumulated errors and may effectively improve the accuracy of the text recognition.

17 Claims, 4 Drawing Sheets

(56) References Cited

U.S. PATENT DOCUMENTS

| | | | | |
|---|---|---|---|---|
| 10,671,878 B1* | 6/2020 | Sarshogh | ............... | G06K 9/627 |
| 2019/0180154 A1* | 6/2019 | Orlov | ..................... | G06N 3/082 |
| 2020/0143191 A1* | 5/2020 | Du | ....................... | G06K 9/6272 |
| 2020/0311460 A1* | 10/2020 | Zheng | ..................... | G06N 3/08 |

FOREIGN PATENT DOCUMENTS

| | | |
|---|---|---|
| CN | 109389091 A | 2/2019 |
| CN | 109543681 A | 3/2019 |
| CN | 109919174 A | 6/2019 |

\* cited by examiner

FIG. 3 collecting a plurality of training pictures, and marking a real position of a text region in each training picture and real text content included in the text region in each training picture — S200 training the end-to-end text recognition model according to each training picture, the real position of the text region in each training picture and the real text content included in the text in each training picture — S201

END-TO-END TEXT RECOGNITION METHOD AND APPARATUS, COMPUTER DEVICE AND READABLE MEDIUM

CROSS REFERENCE TO RELATED APPLICATIONS

The present application claims the priority of Chinese Patent Application No. 201910602608.4, filed on Jul. 5, 2019. The disclosure of the above applications is incorporated herein by reference in its entirety.

TECHNICAL FIELD

The present disclosure relates to the technical field of computer application, and particularly to an end-to-end text recognition method and apparatus, computer device and readable medium.

BACKGROUND

Recognizing text in a picture is a very important job in the field of text recognition. There are very high requirements for accuracy and efficiency of the text recognition.

A single text recognition model is usually employed for processing in a conventional method of recognizing texts in a picture. The text recognition module may use processing in a plurality of serially-arranged steps, for example, detection, row generation and row recognition, to recognize any input picture containing texts, and output a position of a text box in the picture and a sequence of characters included in the text box.

However, since the above conventional text recognition solution is implemented with the plurality of serially-arranged steps, it is prone to introduce accumulated errors and cause undesirable text recognition accuracy.

SUMMARY

The present disclosure provides an end-to-end text recognition method and apparatus, computer device and readable medium, to avoid accumulated errors and improve the accuracy of text recognition.

According to an embodiment of the present disclosure, an end-to-end text recognition method is proposed, and the method includes: obtaining a to-be-recognized picture containing a text region; recognizing a position of the text region in the to-be-recognized picture and text content included in the text region with a pre-trained end-to-end text recognition model; the end-to-end text recognition model including a region of interest perspective transformation processing module for performing perspective transformation processing for the text region.

According to an embodiment of the present disclosure, an end-to-end text recognition apparatus is proposed, and the apparatus includes: an obtaining module configured to obtain a to-be-recognized picture containing a text region; a recognition module configured to recognize a position of the text region in the to-be-recognized picture and text content included in the text region with a pre-trained end-to-end text recognition model; the end-to-end text recognition model including a region of interest perspective transformation processing module for performing perspective transformation processing for the text region.

According to an embodiment of the present disclosure, a computer device is further proposed, and the computer device includes: one or more processors, a storage for storing one or more programs, the one or more programs, when executed by said one or more processors, enable said one or more processors to implement the above-mentioned end-to-end text recognition method.

According to an embodiment of the present disclosure, it is further proposed a computer readable medium on which a computer program is stored, the program, when executed by a processor, implementing the above-mentioned end-to-end text recognition method.

According to the end-to-end text recognition method and apparatus, computer device and readable medium of the present disclosure, a to-be-recognized picture containing a text region is obtained; a position of the text region in the to-be-recognized picture and text content included in the text region is recognized with a pre-trained end-to-end text recognition model; the end-to-end text recognition solution of this embodiment employs the pre-trained end-to-end text recognition model, and may directly predict the position of the text region in the to-be-recognized picture and the text content included in the text region. As compared with the solution using a plurality of serially-arranged steps to implement the text recognition in the prior art, the technical solution of the present disclosure does not need to serially arrange a plurality of steps, and may avoid introducing accumulated errors and thus may effectively improve the accuracy of the text recognition. Furthermore, the end-to-end text recognition model according to this embodiment further includes the RoI perspective transformation processing module for performing perspective transformation processing for the feature expression of the text region, which can not only perform accurate and effective recognition for regular texts in the picture, but also perform accurate and effective recognition for irregular texts in the picture, improve the text recognition efficiency and expand the scenarios adapted for the text recognition model.

DETAILED DESCRIPTION OF EMBODIMENTS

The present disclosure will be described in detail with reference to figures and specific embodiments to make objectives, technical solutions and advantages of the present disclosure more apparent.

Artificial intelligence (AI) is a new technological science which researches and develops theories, methods, techniques and application systems for simulating, extending and expanding human intelligence. Artificial intelligence, as a branch of computer sciences, is intended to learn about essence of intelligence and produce a new intelligent machine which is capable of responding in a manner similar to human intelligence. Research in the field includes robots, language recognition, image recognition, natural language processing, expert systems and the like. Based on the AI technology, various neural network models may be employed to implement various applications. For example, in the present disclosure, an end-to-end text recognition model may be employed based on the AI technology to perform recognition of texts in the pictures, and furthermore, the end-to-end text recognition model in the present disclosure includes a Region of Interest (RoI) perspective transformation processing module which is configured to perform perspective transformation processing for feature expressions of a text region, can perform recognition for irregular texts and improve the accuracy of the text recognition.

Figure 1:
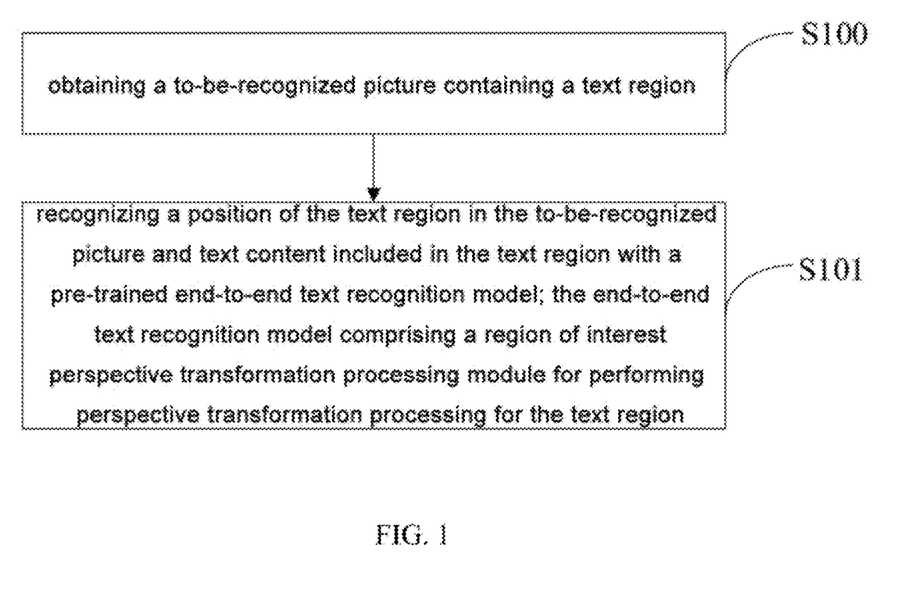
FIG. 1 is a flowchart of an end-to-end text recognition method according to an embodiment of the present disclosure.

FIG. 1 is a flowchart of an end-to-end text recognition method according to an embodiment of the present disclosure. As shown in FIG. 1, the end-to-end text recognition method according to this embodiment may specifically include the following steps:

S100: obtaining a to-be-recognized picture containing a text region;

S101: recognizing a position of the text region in the to-be-recognized picture and text content included in the text region with a pre-trained end-to-end text recognition model; the end-to-end text recognition model comprising a RoI perspective transformation processing module for performing perspective transformation processing for feature expressions of the text region.

A subject for executing the end-to-end text recognition method according to this embodiment is an end-to-end text recognition apparatus. The end-to-end text recognition apparatus may be an electronic entity, or an application employing software integration, which, when used, runs on a computer device.

Specifically, upon text recognition, the to-be-recognized picture including the text region is input into the end-to-end text recognition apparatus. After obtaining the to-be-recognized picture, the end-to-end text recognition apparatus inputs the to-be-recognized picture into the pre-trained end-to-end text recognition model. The end-to-end text recognition model may directly output the position of the text region in the to-be-recognized picture and the text content included in the text region. Furthermore, the end-to-end text recognition model includes the RoI perspective transformation processing module for performing perspective transformation processing for the text region. For example, the perspective transformation processing may include processing including rotating and segmenting the text region to obtain a plurality of regions with a fixed height and variable lengths. Therefore, texts with irregularities such as backlog and overlap in the picture may be recognized.

Optionally, the end-to-end text recognition model according to this embodiment may further include a global feature obtaining module, a region detection module and a text recognition module. The end-to-end text recognition model according to this embodiment internally include the above four modules, but the whole framework is a unified model and may implement the end-to-end text recognition as the whole.

Figure 2:
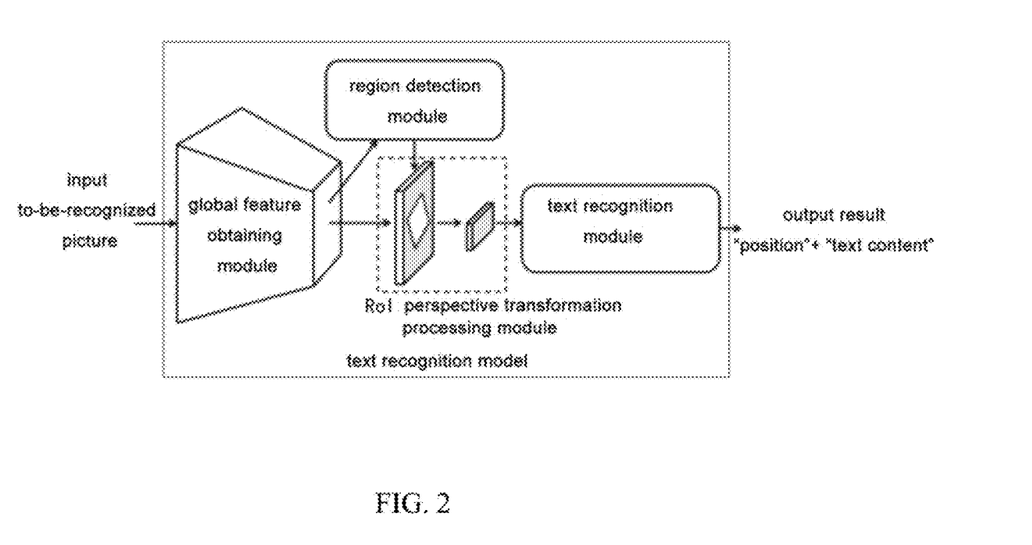
FIG. 2 is a schematic diagram of text recognition performed by an end-to-end text recognition model according to an embodiment of the present disclosure.

For example, FIG. 2 is a schematic diagram of text recognition performed by an end-to-end text recognition model according to an embodiment of the present disclosure. As shown in FIG. 2, the step 101 "recognizing a position of the text region in the to-be-recognized picture and text content included in the text region with a pre-trained end-to-end text recognition model" may specifically include: inputting the to-be-recognized picture into the end-to-end text recognition model, the global feature obtaining module in the end-to-end text recognition model obtaining and outputting a global feature expression of the to-be-recognized picture; the region detection module in the text recognition model detecting the position of the text region according to the global feature expression, and outputting the position; the RoI perspective transformation processing module in the end-to-end text recognition model obtaining a feature expression of the text region from the global feature expression according to the position of the text region, and performing perspective transformation processing for the feature expression of the text region to obtain an aligned region of interest feature expression; the text recognition module in the end-to-end text recognition model recognizing the text content included in the text region based on a spatial attention mechanism and according to the aligned region of interest feature expression, and output the text content.

The global feature obtaining module may be a backbone network based on a full convolution, and the backbone network provides a shared convolution parameter, obtains and outputs a shared feature graph as the global feature expression of the to-be-recognized picture. For example, the backbone network portion may include a base network and a feature fusion network. The base network portion includes but is not limited to ResNet-50, inception-v3, inception-v4 and the like, and this portion may employ any image classification network structure as the basis. The feature fusion network portion combines multi-scale features in the base network to obtain multi-scale features with an invariable relative scale. This portion may employ a common feature combination manner such as UNet or FPN, but is not limited thereto, thereby ensuring simple use and extensibility of the backbone network base and the multi-scale features.

The region detection module is configured to output the position of the text region, for example, a most frequently-used representation manner of the text region is a quadrangle. The region detection module may operate based on a full convolution to directly predict deviation coordinates with four corner point positions, the predicted positions obtained after variation processing form a quadrangular text region, and a Non-Maximum Suppression (NMS) algorithm is employed to obtain positional coordinates of four vertexes of a final candidate quadrangular box. The positional coordinates of the four vertexes are also the positional information finally output by the text recognition model. In practical application, the text region may also be represented with other shapes, so long as the region detection module obtains the position representation of the text region. In this embodiment, there may be a plurality of text regions in a picture, namely, the region detection module is used to detect positional coordinates of four vertexes of the candidate quadrangular box corresponding to each text region in the plurality of text regions in the picture.

The RoI perspective transformation processing module extracts the feature expression corresponding to the text region from the global feature expression of the to-be-recognized picture according to the position of the text region, and performs the perspective transformation processing for the feature expression of the text region, for example, transforms the quadrangular candidate box of the text region into a feature graph with a fixed height and a variable width, and meanwhile maintains that a width-to-length ratio of a sequence recognition feature does not change.

For example, the input of the RoI perspective transformation processing module is the global feature expression of the to-be-recognized picture obtained by the global feature obtaining module, and the position of the text region obtained by the region detection module. The RoI perspective transformation processing module obtains the text region corresponding to the position of the text region from the global feature expression, as a RoI region. The Ro perspective transformation processing module performs perspective transformation for each RoI region to obtain a plurality of small feature expressions with a fixed height and a variable length, as a RoI feature expression for subsequent further recognition processing by the text recognition module. Specifically, each text region in the picture corresponds to a RoI feature expression. The number of text regions is the same as that of small RoI feature expressions. The perspective transformation calculation may employ the following equation:

$$\begin{pmatrix} u \\ v \\ w \end{pmatrix} = T_\theta \begin{pmatrix} x_k^t \\ y_k^t \\ 1 \end{pmatrix}$$

where $T_\theta$ is a matrix of perspective transformation;

$$\begin{pmatrix} u \\ v \\ w \end{pmatrix}$$

represents a vector representation of input coordinates, $$\begin{pmatrix} x_k^t \\ y_k^t \\ 1 \end{pmatrix}$$

represents a vector representation of output coordinates; where $(x_k^t, y_k^t)$ are real output coordinates, k represents the $k^{th}$ pixel, and the superscript t is a mark of the output coordinates and used to differentiate from the input coordinates $(x_k^s, y_k^s)$, where $x_k^s = u/w$, $y_k^s = v/w$, where u,v,w are intermediate variables, k represents any $k^{th}$ pixel, $\forall k=1, 2, \ldots, h^t w^t$, where $h^t$ represents a height of the to-be-recognized picture, and $w^t$ represents a width of the to-be-recognized picture; $h^t w^t$ represents multiplying the width of the to-be-recognized picture by the height. Each output pixel value may be obtained by performing bilinear interpolation for the input global feature expression through the following equation.

$$V_k = \sum_n^{h^s} \sum_m^{w^s} U_{nm} K(x_k^s - m) K(y_k^s - n)$$

where $V_k$ represents an output value of the $k^{th}$ pixel, $U_{nm}$ represents a value at the position (n, m), and a kernel function is represented as:

$$K(\cdot) = \max(0, 1 - |\cdot|)$$

where the bilinear interpolation operation includes performing processing for features of each channel respectively, and finally obtaining the aligned RoI feature expression after the perspective transformation. The RoI feature of each text region in the picture may be obtained in the manner stated in this embodiment. In practical application, the RoI features of respective text regions may be output in turn in a certain order, for example, in a left-to-right and up-to-down order.

Figure 3:
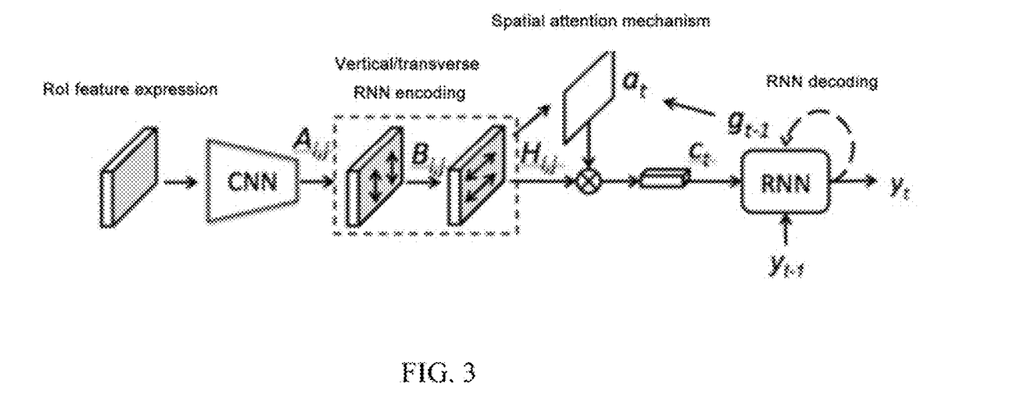
FIG. 3 is a working principle diagram of the end-to-end text recognition module in FIG. 2.

FIG. 3 is a working principle diagram of the text recognition module in FIG. 2. As shown in FIG. 3, the text recognition module inputs the aligned RoI region feature expression after the processing of the RoI perspective transformation processing module, and outputs a finally-recognized characters sequence result. A given RoI region feature expression output after the RoI perspective transformation is subjected to convolution-pooling operation-RNN encoder to obtain the feature $H_{i,j}$, and the feature is decoded by an RNN decoder based on a spatial attention mechanism to obtain a character $y_t$ corresponding to each time t.

The encoder is formed by stacking convolution layer+ pooling operations to obtain the feature $A_{i,j}$, for example, may employ four layers of convolution operations and two max-pooling operations, each layer of convolution being followed by a batch normalization+ReLU operation, every two convolution layers being connected with a max-pooling. The RNN portion includes RNN encoding of two layers including a vertical layer and a horizontal layer, and the vertical layer RNN encoding is performed for each column of features to obtain the feature $B_{i,j}$, and the horizontal layer RNN encoding is performed for each row of features to obtain an encoder output $H_{i,j}$. Finally, a result after the RoI aligned feature is subject to the RNN encoding is obtained, and includes contextual character features.

As shown in FIG. 3, the RNN-based decoder may take a state $g_{t-1}$ of a previous time, namely, t−1, and the feature $H_{i,j}$ output by the encoder as input, and calculate to obtain a spatial attention distribution feature $\alpha_t$; and weight the feature $H_{i,j}$ output by the encoder at each time t to obtain a feature vector $c_t$; and then take a character $y_{t-1}$ at the previous time namely t−1, and the feature vector $c_t$ as input, and calculate through RNN to obtain a character $y_t$ output at a current time t.

According to the above technical solution of the end-to-end text recognition method according to this embodiment, since the end-to-end text recognition model includes the RoI perspective transformation processing module, the pre-trained end-to-end text recognition model may be employed to directly predict the position of the text region in the to-be-recognized picture and the text content included in the text region. As compared with the solution using a plurality of serially-arranged steps to implement the text recognition in the prior art, the technical solution of the present disclosure does not need to serially arrange a plurality of steps, and may avoid introducing accumulated errors and thus may effectively improve the accuracy of the text recognition. Furthermore, the end-to-end text recognition model according to this embodiment further includes the Ro perspective transformation processing module for performing perspective transformation processing for the feature expression of the text region, which may not only perform accurate and effective recognition for regular texts in the picture, but also perform accurate and effective recognition for irregular texts in the picture, improve the text recognition efficiency and expand the scenarios adapted for the text recognition model.

Figure 4:
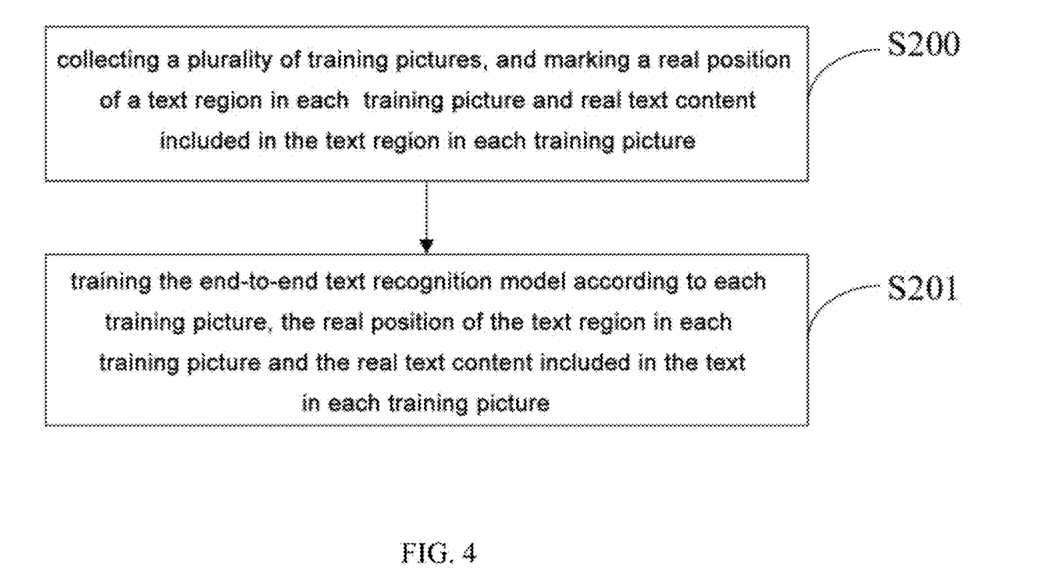
FIG. 4 is a flowchart of an end-to-end text recognition method according to an embodiment of the present disclosure.

FIG. 4 is a flowchart of an end-to-end text recognition method according to an embodiment of the present disclosure. As shown in FIG. 4, according to the end-to-end text recognition method according to this embodiment, a training process of the end-to-end text recognition model employed in the embodiment shown in FIG. 2 is introduced in detail on the basis of the technical solution of the embodiment shown in FIG. 1. The end-to-end text recognition method according to this embodiment may specifically include the following steps:

S200: collecting a plurality of training pictures, and marking a real position of a text region in each of the plurality of training pictures and the real text content included in the text region in each of the plurality of training pictures;

S201: training an end-to-end text recognition model according to each of the plurality of training pictures, the real position of the text region in each of the plurality of training pictures and the real text content included in the text region in each of the plurality of training pictures.

For example, upon training, the step S201 may specifically include the following steps:

(a) inputting a training picture of the plurality of training pictures into the end-to-end text recognition model, the end-to-end text recognition model outputting a predicted position of a text region in the training picture and predicted text content included in the text region;

(b) detecting whether the predicted position of the text region in the training picture is consistent with the real position of the text region in the training picture, and whether the predicted text content included in the text region is consistent with the real text content included in the text region; if the predicted position of the text region is not consistent with the real position, and the predicted text content included in the text region is not consistent with the real text content, performing step (c); if consistent, performing step (d);

In this embodiment, if a difference between the predicted position of the text region of the training picture and the real position is in a small preset distance range, it is believed that the predicted position of the text region is consistent with the real position. The predicted text content is consistent with the real text content only when they are completely the same, otherwise they are inconsistent.

In addition, optionally, in this embodiment, a loss function may further be created based on the predicted positions of the text regions of the training pictures and the real positions, and the predicted text content included in the text regions and the real text content. Upon training, a value of the loss function is calculated to judge whether the value of the loss function is smaller than a preset threshold; if the value is not less than the preset threshold, parameters may be adjusted according to the following step (c), and a purpose of adjusting the parameters is to make the value of the loss function smaller than the preset threshold.

(c) adjusting one or more parameters for the global feature obtaining module, the RoI perspective transformation processing module, the region detection module and the text recognition module in the end-to-end text recognition model, so that the predicted position of the text region tend to be consistent with the real position, and the predicted text content included in the text region tends to be consistent with the real text content;

In this embodiment, since the end-to-end text recognition model includes the global feature obtaining module, the RoI perspective transformation processing module, the region detection module and the text recognition module, the parameters in the global feature obtaining module, the RoI perspective transformation processing module, the region detection module and the text recognition module all may be adjusted when training is performed. Upon adjustment, the parameters of respective modules may be adjusted sequentially in turn; in each round of training or a designated continuous number of rounds of training, the parameters in one of the modules may be adjusted, and so on so forth, so that the parameters of the plurality of modules are adjusted in turn. As such, the adjustment of the parameters of the end-to-end text recognition model may be finally achieved. Certainly, in practical application, it is also possible to simultaneously adjust the parameters in two, three or four modules in the four modules, which is not limited herein.

(d) judging whether the number of times of training reaches a preset threshold of number of times, or judging, in the trainings of a preset successive number of times, whether the predicted positions of the text regions of the respective training pictures output by the end-to-end text recognition model are consistent with the real positions, respectively, and whether the predicted text contents included in the text regions are consistent with the real text contents respectively, and if not, returning to step (a) to continue the training; otherwise, if yes, determining that the predicted positions of the text regions of the respective training pictures output by the end-to-end text recognition model are always consistent with the real positions, and that the predicted text contents included in the text regions are always consistent with the real text contents, respectively, and end the training, determining the parameters in the global feature obtaining module, the Ro perspective transformation processing module, the region detection module and the text recognition module in the end-to-end text recognition model, the process ends.

In this embodiment, the preset threshold of the number of times may be set to be a maximum threshold of the number of times of training according to actual needs. If the number of times of training reaches the preset threshold of the number of times, it may be believed that the model has already been duly trained, and the training of the model ends.

Alternatively, in this embodiment, it is possible to set the trainings of the preset successive number of times to include successive 100 rounds, 50 rounds, 10 rounds, 5 rounds or rounds of other numbers according to actual needs. As such, judgment is performed whether the predicted positions of the text regions of the respective training pictures are always consistent with the real positions, and whether the predicted text contents included in the text regions are always consistent with the real text contents, respectively, in the trainings of the preset successive number of times. In the case of consistency, it may be believed that the end-to-end text recognition model has already been trained maturely and may be used for end-to-end text recognition, whereupon the training ends; in the case of inconsistence, it may be believed that the end-to-end text recognition model still needs to be further trained, and the above steps are repeated to continue the training.

In the training of the most neighboring preset number of rounds, upon whether the predicted positions of the text regions of the respective training pictures output by the end-to-end text recognition model are always consistent with the real positions, respectively, and whether the predicted text contents included in the text regions are always consistent with the real text content respectively is only a training cutoff condition. In practical application, it is also possible to set a maximum threshold of number of rounds of training, employ the collected training pictures to continue training constantly until the number of rounds of training reaches the maximum threshold of number of rounds. At this time, it may be believed that the predicted positions of the text regions of the respective training pictures output by the end-to-end text recognition model currently being trained should be always consistent with the real positions, and the predicted text contents included in the text regions should be always consistent with the real text content. At this time, it is feasible to end the training, and determine the parameters in the global feature obtaining module, the RoI perspective transformation processing module, the region detection module and the text recognition module in the end-to-end text recognition model, and determine the end-to-end text recognition model.

In this embodiment, the maximum threshold of the number of times of training may be set sufficiently large, for example, may reach the magnitude of million, ten million even hundreds of millions. The larger the number of rounds of training is, the more accurate the trained end-to-end text recognition model may be.

The training process of the end-to-end text recognition model of this embodiment is also an end-to-end training process. In the collected training pictures, the real position of the text region and the real text content included in the text region in each training picture are marked in advance, to facilitate subsequent comparison with the predicted information and implement parameter adjustment, and reach the purpose of training the model.

The subject for executing the end-to-end text recognition method of this embodiment may be consistent with the above FIG. 1, and also implemented by the end-to-end text recognition apparatus. That is, the end-to-end text recognition apparatus trains the end-to-end text recognition model, and then the end-to-end text recognition apparatus performs the text recognition based on the duly-trained end-to-end text recognition model, by employing the technical solution of the embodiment shown in FIG. 1.

Alternatively, the subject for executing the end-to-end text recognition method of this embodiment may be different from the subject of executing the embodiment of the above FIG. 1, and may be a training apparatus of the end-to-end text recognition model independent from the end-to-end text recognition apparatus. Upon specific use, the training apparatus of the end-to-end text recognition model first trains the end-to-end text recognition model, and then upon recognizing the texts, the end-to-end text recognition apparatus directly invokes the duly-trained end-to-end text recognition model to perform text recognition by employing the technical solution of the embodiment shown in FIG. 1.

According to the end-to-end text recognition method of this embodiment and by employing the above technical solution, it is possible to train an accurate, end-to-end text recognition model, and after the to-be-recognized picture is input, directly predict the position of the text region and the text content included in the text region, without need to serially arrange a plurality of steps, which may avoid introducing the accumulated errors and may effectively improve the accuracy of the text recognition. Furthermore, in this embodiment, the trained end-to-end text recognition model can not only perform accurate and effective recognition for regular texts in the picture, but also perform accurate and effective recognition for irregular texts in the picture, and thus may improve the text recognition efficiency and expand the scenarios adapted for the text recognition model.

In addition, in this embodiment, the effect of the end-to-end text recognition performed by the end-to-end text recognition model of this embodiment is verified under the scenarios of regular text datasets ICDAR-13 and ICDAR-15. Specifically, the performance of F-score 91.3%, 87.37% may be respectively achieved on the detection tasks of ICDAR-13 and ICDAR-15. As compared with the separate detection of the current two-phase system, the F-score index of the ICDAR-15 test set rises by +4.13%, and correspond to the optimal level of known index.

Furthermore, in this embodiment, the effect of the end-to-end text recognition performed by the end-to-end text recognition model of this embodiment is also verified in an irregular text dataset Total-Text. Specifically, as compared with the baseline method as stated in a published thesis, the F-score detected according to the text recognition solution of this embodiment rises from 36% to 63.53%, and as compared with the method of separate detection in the two-phase system, the end-to-end index F-score rises by 9% to 54.02%, and achieve the optimal performance level of the irregular text dataset.

As known from the above, the effectiveness of the end-to-end text recognition model performing end-to-end text recognition according to this embodiment is verified in both the regular text dataset and irregular text dataset, the optimal level of the open index can be achieved in the regular text recognition and irregular text recognition simultaneously, and the strong performance of the text recognition solution of this embodiment is proved again.

A conventional text recognition model employs the processing of a plurality of serially-arranged steps, each step corresponds to an independent module, and the execution of the module corresponding to each intermediate step depends on the execution result of the module corresponding to a previous step and affects the execution of the module corresponding to next step. In this manner, since a problem needs to be solved with a plurality of serially-arranged steps, the conventional text recognition model belongs to a non-end-to-end text recognition model, and such a text recognition model will introduce accumulated errors and cause the poor accuracy of the text recognition.

In contrast, as known from the above embodiment, the text recognition model of this embodiment is an end-to-end text recognition model which is already subjected to deep learning, and belongs to a deep learning model. As shown in the above embodiment, the plurality of modules included in the end-to-end text recognition model are trained together. Upon use, each module does not output a result separately, and the whole text recognition model only outputs one final result according to the input, i.e., a problem can be solved with one step. For example, the to-be-recognized picture is input into the end-to-end text recognition model, and the end-to-end text recognition model may directly output the position of the text region in the to-be-recognized picture and the text content included in the text region. As employing the end-to-end implementation manner, the end-to-end text recognition model of this embodiment does not introduce accumulated errors and may effectively improve the accuracy of text recognition.

Figure 5:
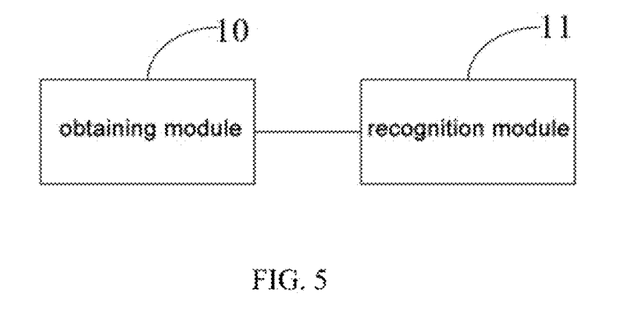
FIG. 5 is a structural diagram of an end-to-end text recognition apparatus according to an embodiment of the present disclosure.

FIG. 5 is a structural diagram of an end-to-end text recognition apparatus according to an embodiment of the present disclosure. As shown in FIG. 5, the end-to-end text recognition apparatus according to this embodiment may specifically include: an obtaining module 10 configured to obtain a to-be-recognized picture containing a text region; a recognition module 11 configured to recognize a position of the text region in the to-be-recognized picture obtained by the obtaining module 10 and text content included in the text region with a pre-trained end-to-end text recognition model; the end-to-end text recognition model including a region of interest perspective transformation processing module for performing perspective transformation processing for the text region.

Principles employed by the end-to-end text recognition apparatus of this embodiment to implement the end-to-end text recognition with the above modules and the achieved technical effects are the same as those of the above-mentioned method embodiments. Please refer to the depictions of the aforesaid relevant method embodiments for details which will not present here.

Optionally, the end-to-end text recognition model according to this embodiment may further include a global feature obtaining module, a region detection module and a text recognition module.

Optionally, in the end-to-end text recognition apparatus of this embodiment, the recognition module 11 may be specifically configured to: input the to-be-recognized picture obtained by the obtaining module 10 into the end-to-end text recognition model, the global feature obtaining module obtaining and outputting a global feature expression of the to-be-recognized picture; the region detection module detecting the position of the text region according to the global feature expression, and outputting the position; the region of interest perspective transformation processing module obtaining a feature expression of the text region from the global feature expression according to the position of the text region, and performing perspective transformation processing for the feature expression of the text region to obtain an aligned region of interest feature expression; the end-to-end text recognition module recognizing the text content included in the text region based on a spatial attention mechanism and according to the aligned region of interest feature expression, and output the text content.

Figure 6:
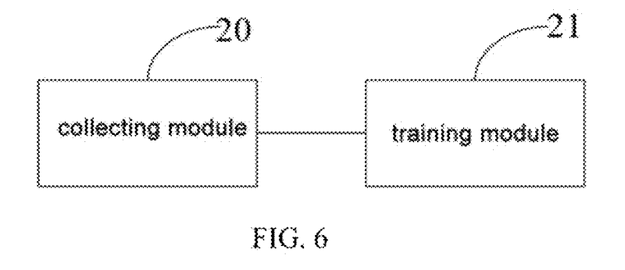
FIG. 6 is a structural diagram of the end-to-end text recognition apparatus according to an embodiment of the present disclosure.

FIG. 6 is a structural diagram of an end-to-end text recognition apparatus according to an embodiment of the present disclosure. As shown in FIG. 6, the end-to-end text recognition apparatus according to this embodiment may specifically include: a collecting module 20 configured to collect a plurality of training pictures, and mark a real position of a text region in each of the plurality of training pictures and real text content included in the text region in each of the plurality of training pictures; a training module 21 configured to train an end-to-end text recognition model according to each of the plurality of training pictures collected by the collecting module 20, the real position of the text region in each of the plurality of training pictures and the real text content included in the text region in each of the plurality of training pictures.

For example, the training module 21 is configured to: input a training picture of the plurality of training pictures collected by the collecting module 20 into the end-to-end text recognition model, the end-to-end text recognition model outputting a predicted positions of a text region in the training picture and predicted text content included in the text region; detect whether the predicted position of the text region in the training picture is consistent with the real position of the text region in the training picture, and whether the predicted text content included in the text region is consistent with the real text content included in the text region; if the predicted position of the text region is not consistent with the real position, and the predicted text content included in the text region is not consistent with the real text content, adjust one or more parameters for the global feature obtaining module, the region of interest perspective transformation processing module, the region detection module and the text recognition module in the end-to-end text recognition model, so that the predicted position of the text region tends to be consistent with the real position, and the predicted text content included in the text region tends to be consistent with the real text content; repeat the above steps until the number of times of training reaches a preset threshold of number of times, or in trainings of a preset successive number of times, the predicted positions of the text regions of training pictures output by the end-to-end text recognition model are consistent with the real positions respectively, and the predicted text contents included in the text regions are always consistent with the real text content respectively.

The end-to-end text recognition apparatus of this embodiment may exist independently, and implements the training of the end-to-end text recognition model. The end-to-end text recognition apparatus of this embodiment may also be combined with the above FIG. 5, to form an optional embodiment of the present disclosure.

Principles employed by the end-to-end text recognition apparatus of this embodiment to implement the end-to-end text recognition with the above modules and the achieved technical effects are the same as those of the above-mentioned method embodiments. Please refer to the depictions of the aforesaid relevant method embodiments for details which will not presented here.

Figure 7:
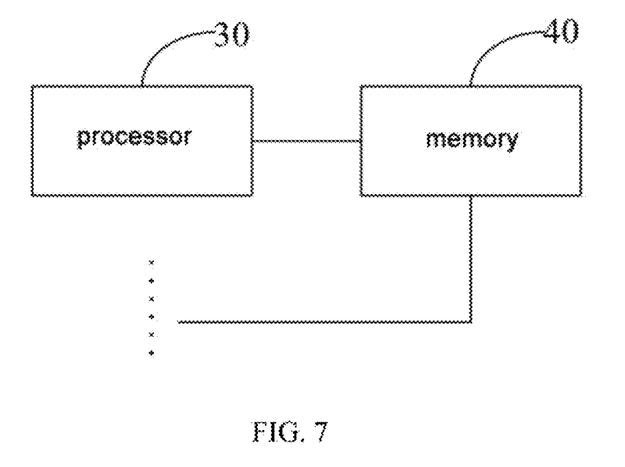
FIG. 7 is a block diagram of a computer device according to an embodiment of the present disclosure.

FIG. 7 is a block diagram of an embodiment of a computer device according to the present disclosure. As shown in FIG. 7, the computer device according to this embodiment includes: one or more processors 30, and a memory 40 for storing one or more programs; the one or more programs stored in the memory 40, when executed by said one or more processors 30, enable said one or more processors 30 to implement the end-to-end text recognition method in the embodiments shown in FIG. 1-FIG. 4. The embodiment shown in FIG. 7 exemplarily includes a plurality of processors 30.

Figure 8:
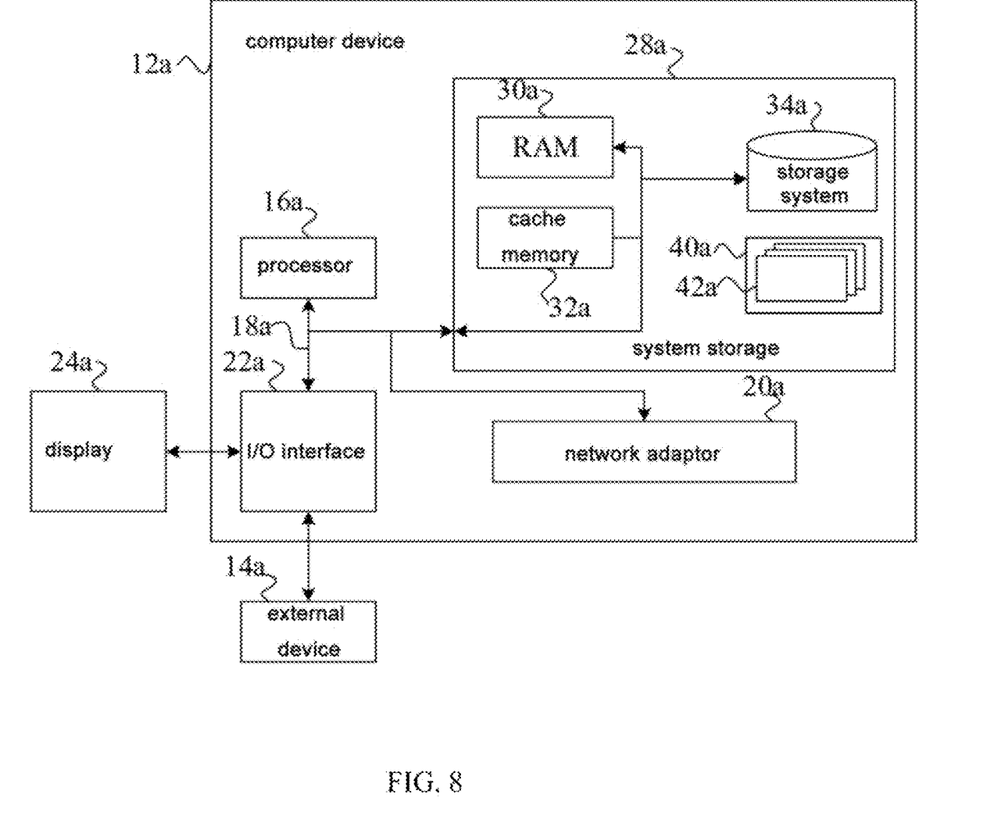
FIG. 8 is an example diagram of a computer device according to an embodiment of the present disclosure.

For example, FIG. 8 is an example diagram of a computer device according to an embodiment of the present disclosure. FIG. 8 shows a block diagram of an example computer device 12a adapted to implement an implementation mode of the present disclosure. The computer device 12a shown in FIG. 8 is only an example and should not bring about any limitation to the function and scope of use of the embodiments of the present disclosure.

As shown in FIG. 8, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 6 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 3 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a via bus 18a. It should be understood that although not shown, other hardware and/or software modules could be used in conjunction with computer device 12a. Examples include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the end-to-end text recognition method shown in the above embodiments.

The present disclosure further provides a computer readable medium on which a computer program is stored, the program, when executed by a processor, implementing the end-to-end text recognition method shown in the above embodiments.

The computer readable medium of this embodiment may include RAM 30a, and/or cache memory 32a and/or a storage system 34a in the system memory 28a in the embodiment shown in FIG. 8.

As science and technology develops, a propagation channel of the computer program is no longer limited to tangible medium, and it may also be directly downloaded from the network or obtained in other manners. Therefore, the computer readable medium in this embodiment may include a tangible medium as well as an intangible medium.

The computer-readable medium of this embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An end-to-end text recognition method, wherein the method comprises:

obtaining a to-be-recognized picture containing a text region;

recognizing a position of the text region in the to-be-recognized picture and text content included in the text region with a pre-trained end-to-end text recognition model; the end-to-end text recognition model comprising a region of interest perspective transformation processing module for performing perspective transformation processing for the text region, a global feature obtaining module, a region detection module and a text recognition module, wherein the end-to-end text recognition model is trained by:

collecting a plurality of training pictures, and marking a real position of a text region in each of the plurality of training pictures and real text content included in the text region in each of the plurality of training pictures, inputting a training picture of the plurality of training pictures into the end-to-end text recognition model, the end-to-end text recognition model outputting a predicted position of a text region in the training picture and predicted text content included in the text region;

detecting whether the predicted position of the text region in the training picture is consistent with the real position of the text region in the training picture, and whether the predicted text content included in the text region is consistent with the real text content included in the text region;

if the predicted position of the text region is not consistent with the real position, and the predicted text content included in the text region is not consistent with the real text content, adjusting one or more parameters for the global feature obtaining module, the region of interest perspective transformation processing module, the region detection module and the text recognition module in the end-to-end text recognition model, so that the predicted position of the text region tends to be consistent with the real position, and the predicted text content included in the text region tends to be consistent with the real text content;

repeating the above steps until the number of times of training reaches a preset threshold of number of times, or in trainings of a preset successive number of times, the predicted positions of the text regions of training pictures output by the end-to-end text recognition model are consistent with the real positions respectively, and the predicted text contents included in the text regions are always consistent with the real text content respectively.

2. The method according to claim 1, wherein the recognizing a position of the text region in the to-be-recognized picture and text content included in the text region with a pre-trained end-to-end text recognition model comprises:

inputting the to-be-recognized picture into the end-to-end text recognition model, the global feature obtaining module obtaining and outputting a global feature expression of the to-be-recognized picture; the region detection module detecting the position of the text region according to the global feature expression, and outputting the position; the region of interest perspective transformation processing module obtaining a feature expression of the text region from the global feature expression according to the position of the text region, and performing perspective transformation processing for the feature expression of the text region to obtain an aligned region of interest feature expression; the end-to-end text recognition module recognizing the text content included in the text region based on a spatial attention mechanism and according to the aligned region of interest feature expression, and output the text content.

3. The method according to claim 1, wherein the to-be-recognized picture is processed by a backbone network based on a full convolution to obtain a global feature expression of the to-be-recognized picture.

4. The method according to claim 3, wherein the position of the text region is represented by positional coordinates of four vertexes of a quadrangle obtained by using a full convolution and a Non-Maximum Suppression algorithm.

5. The method according to claim 4, wherein performing perspective transformation processing for the text region comprises:

performing perspective transformation processing for the text region to obtain a plurality of region of interest feature expressions with a fixed height and variable lengths.

6. The method according to claim 5, wherein performing perspective transformation processing comprises calculation according to the following equation:

$$\begin{pmatrix} u \\ v \\ w \end{pmatrix} = T_\theta \begin{pmatrix} x_k^t \\ y_k^t \\ 1 \end{pmatrix}$$

where $T_\theta$ is a matrix of perspective transformation;

$$\begin{pmatrix} u \\ v \\ w \end{pmatrix}$$

represents a vector representation of input coordinates, $$\begin{pmatrix} x_k^t \\ y_k^t \\ 1 \end{pmatrix}$$

represents a vector representation of output coordinates; where $(x_k^t, y_k^t)$ are real output coordinates, k represents the $k^{th}$ pixel, and the superscript t is a mark of the output coordinates and used to differentiate from the input coordinates $(x_k^s, y_k^s)$, where $x_k^s = u/w$, $y_k^s = v/w$, where u, v, w are intermediate variables; k represents any $k^{th}$ pixel, $\forall k=1, 2, \ldots, h^t w^t$, where $h^t$ represents a height of the to-be-recognized picture, and $Iv^t$ represents a width of the to-be-recognized picture; $h^t w^t$ represents multiplying the width of the to-be-recognized picture by the height, and wherein an output value for a pixel is obtained by performing a bilinear interpolation operation for an input region of interest feature expression according to the following equation, $$V_k = \Sigma_n^{h^s} \Sigma_m^{w^s} U_{nm} K(x_k^s - m) K(y_k^s - n)$$

where $V_k$ represents an output value of the $k^{th}$ pixel, $U_{nm}$ represents a value at the position (n, m), and a kernel function is represented as:

$$K(\cdot) = \max(0, 1 - |\cdot|)$$

wherein the bilinear interpolation operation is performed for features of each channel respectively, so as to obtain the aligned region of interest feature expression.

7. The method according to claim 5, wherein the plurality of region of interest feature expressions are processed by a convolution-pooling operation, vertical and horizontal RNN encoding, and RNN decoding based on a spatial attention mechanism to obtain the text content included in the text region.

8. A computer device, wherein the device comprises:
one or more processors,
a storage for storing one or more programs,
the one or more programs, when executed by said one or more processors, enable said one or more processors to implement an end-to-end text recognition method, wherein the method comprises:
obtaining a to-be-recognized picture containing a text region;
recognizing a position of the text region in the to-be-recognized picture and text content included in the text region with a pre-trained end-to-end text recognition model; the end-to-end text recognition model comprising a region of interest perspective transformation processing module for performing perspective transformation processing for the text region, a global feature obtaining module, a region detection module and a text recognition module,
wherein the end-to-end text recognition model is trained by:
collecting a plurality of training pictures, and marking a real position of a text region in each of the plurality of training pictures and real text content included in the text region in each of the plurality of training pictures,
inputting a training picture of the plurality of training pictures into the end-to-end text recognition model, the end-to-end text recognition model outputting a predicted position of a text region in the training picture and predicted text content included in the text region;
detecting whether the predicted position of the text region in the training picture is consistent with the real position of the text region in the training picture, and whether the predicted text content included in the text region is consistent with the real text content included in the text region;
if the predicted position of the text region is not consistent with the real position, and the predicted text content included in the text region is not consistent with the real text content, adjusting one or more parameters for the global feature obtaining module, the region of interest perspective transformation processing module, the region detection module and the text recognition module in the end-to-end text recognition model, so that the predicted position of the text region tends to be consistent with the real position, and the predicted text content included in the text region tends to be consistent with the real text content;
repeating the above steps until the number of times of training reaches a preset threshold of number of times, or in trainings of a preset successive number of times, the predicted positions of the text regions of training pictures output by the end-to-end text recognition model are consistent with the real positions respectively, and the predicted text contents included in the text regions are always consistent with the real text content respectively.

9. The computer device according to claim 8, wherein the recognizing a position of the text region in the to-be-recognized picture and text content included in the text region with a pre-trained end-to-end text recognition model comprises:
inputting the to-be-recognized picture into the end-to-end text recognition model, the global feature obtaining module obtaining and outputting a global feature expression of the to-be-recognized picture; the region detection module detecting the position of the text region according to the global feature expression, and outputting the position; the region of interest perspective transformation processing module obtaining a feature expression of the text region from the global feature expression according to the position of the text region, and performing perspective transformation processing for the feature expression of the text region to obtain an aligned region of interest feature expression; the end-to-end text recognition module recognizing the text content included in the text region based on a spatial attention mechanism and according to the aligned region of interest feature expression, and output the text content.

10. The computer device according to claim 8, wherein the to-be-recognized picture is processed by a backbone network based on a full convolution to obtain a global feature expression of the to-be-recognized picture, and
wherein the position of the text region is represented by positional coordinates of four vertexes of a quadrangle obtained by using a full convolution and a Non-Maximum Suppression algorithm.

11. The computer device according to claim 10, wherein performing perspective transformation processing for the text region comprises:
performing perspective transformation processing for the text region to obtain a plurality of region of interest feature expressions with a fixed height and variable lengths.

12. The computer device according to claim 11, wherein the plurality of region of interest feature expressions are processed by a convolution-pooling operation, vertical and horizontal RNN encoding, and RNN decoding based on a spatial attention mechanism to obtain the text content included in the text region.

13. A non-transitory computer readable medium on which a computer program is stored, wherein the program, when executed by a processor, implements an end-to-end text recognition method, wherein the method comprises:
   obtaining a to-be-recognized picture containing a text region;
   recognizing a position of the text region in the to-be-recognized picture and text content included in the text region with a pre-trained end-to-end text recognition model; the end-to-end text recognition model comprising a region of interest perspective transformation processing module for performing perspective transformation processing for the text region, a global feature obtaining module, a region detection module and a text recognition module,
   wherein the end-to-end text recognition model is trained by:
   collecting a plurality of training pictures, and marking a real position of a text region in each of the plurality of training pictures and real text content included in the text region in each of the plurality of training pictures,
   inputting a training picture of the plurality of training pictures into the end-to-end text recognition model, the end-to-end text recognition model outputting a predicted position of a text region in the training picture and predicted text content included in the text region;
   detecting whether the predicted position of the text region in the training picture is consistent with the real position of the text region in the training picture, and whether the predicted text content included in the text region is consistent with the real text content included in the text region;
   if the predicted position of the text region is not consistent with the real position, and the predicted text content included in the text region is not consistent with the real text content, adjusting one or more parameters for the global feature obtaining module, the region of interest perspective transformation processing module, the region detection module and the text recognition module in the end-to-end text recognition model, so that the predicted position of the text region tends to be consistent with the real position, and the predicted text content included in the text region tends to be consistent with the real text content;
   repeating the above steps until the number of times of training reaches a preset threshold of number of times, or in trainings of a preset successive number of times, the predicted positions of the text regions of training pictures output by the end-to-end text recognition model are consistent with the real positions respectively, and the predicted text contents included in the text regions are always consistent with the real text content respectively.

14. The non-transitory computer readable medium according to claim 13,
   wherein the recognizing a position of the text region in the to-be-recognized picture and text content included in the text region with a pre-trained end-to-end text recognition model comprises:
   inputting the to-be-recognized picture into the end-to-end text recognition model, the global feature obtaining module obtaining and outputting a global feature expression of the to-be-recognized picture; the region detection module detecting the position of the text region according to the global feature expression, and outputting the position; the region of interest perspective transformation processing module obtaining a feature expression of the text region from the global feature expression according to the position of the text region, and performing perspective transformation processing for the feature expression of the text region to obtain an aligned region of interest feature expression; the end-to-end text recognition module recognizing the text content included in the text region based on a spatial attention mechanism and according to the aligned region of interest feature expression, and output the text content.

15. The non-transitory computer readable medium according to claim 13, wherein the to-be-recognized picture is processed by a backbone network based on a full convolution to obtain a global feature expression of the to-be-recognized picture, and
   wherein the position of the text region is represented by positional coordinates of four vertexes of a quadrangle obtained by using a full convolution and a Non-Maximum Suppression algorithm.

16. The non-transitory computer readable medium according to claim 15, wherein performing perspective transformation processing for the text region comprises:
   performing perspective transformation processing for the text region to obtain a plurality of region of interest feature expressions with a fixed height and variable lengths.

17. The non-transitory computer readable medium according to claim 16, wherein the plurality of region of interest feature expressions are processed by a convolution-pooling operation, vertical and horizontal RNN encoding, and RNN decoding based on a spatial attention mechanism to obtain the text content included in the text region.

* * * * *